(12) United States Patent
Purcell et al.

(10) Patent No.: US 11,386,086 B2
(45) Date of Patent: Jul. 12, 2022

(54) PERMUTATION-BASED MACHINE LEARNING FOR DATABASE QUERY OPTIMIZATION

(71) Applicant: International Business Machines Corporation, Armonk, NY (US)

(72) Inventors: Terence P. Purcell, Springfield, IL (US); Thomas A. Beavin, Milpitas, CA (US); Martin Dinh, San Jose, CA (US); Brian L. Baggett, Renton, WA (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 16/117,003

(22) Filed: Aug. 30, 2018

(65) Prior Publication Data

US 2020/0073986 A1    Mar. 5, 2020

(51) Int. Cl.
*G06F 16/2453* (2019.01)
*G06F 16/21* (2019.01)
*G06N 20/00* (2019.01)
*G06F 16/242* (2019.01)

(52) U.S. Cl.
CPC ........ *G06F 16/24544* (2019.01); *G06F 16/21* (2019.01); *G06F 16/2433* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 8,756,561 B2 | 6/2014 | Peterson | |
| 9,117,028 B2 | 8/2015 | Norton et al. | |
| 2003/0187858 A1* | 10/2003 | Kirk | G06F 16/24545 |
| 2004/0030677 A1* | 2/2004 | Young-Lai | G06F 16/24542 |
| 2008/0313596 A1 | 12/2008 | Kreamer et al. | |
| 2009/0106219 A1* | 4/2009 | Belknap | G06F 16/24545 |

(Continued)

OTHER PUBLICATIONS

Robinson et al., "Cost-Based Query Optimization via AI Planning," 2014 (Year: 2014).*

(Continued)

*Primary Examiner* — Yu Zhao
(74) *Attorney, Agent, or Firm* — Schmeiser, Olsen & Watts; Stephanie Carusillo

(57) ABSTRACT

A DBMS query-optimization module receives a corpus of training data that contains data-access requests, such as SQL queries. Each request specifies data to be accessed but does not specify a query plan that the database should use to generate the requested data. The module identifies, in each received request, parameters, such as join methods and access methods, that can vary among query plans; and variables that cannot be assigned values until the query is actually processed. The system generates a set of queries, each of which implements a distinct query plan, that specify every viable permutation of values of the parameters and of the variables. The generated queries are added to the received corpus, which is forwarded to a machine-learning module in order to train the query-optimizer to select query plans that incur the lowest resource costs when servicing a particular type of query.

15 Claims, 5 Drawing Sheets

(56) References Cited

U.S. PATENT DOCUMENTS

| | | | | |
|---|---|---|---|---|
| 2011/0314000 | A1* | 12/2011 | Chaudhuri | G06F 16/24542 707/718 |
| 2012/0173515 | A1* | 7/2012 | Jeong | G06F 16/258 707/718 |
| 2016/0179890 | A1* | 6/2016 | Chiang | G06F 16/24544 707/714 |
| 2016/0259825 | A1* | 9/2016 | To | G06F 16/24542 |
| 2017/0147639 | A1* | 5/2017 | Lee | G06F 16/24539 |
| 2018/0121507 | A1* | 5/2018 | Li | G06F 16/24545 |
| 2020/0142894 | A1* | 5/2020 | Papaemmanouil | G06F 16/24542 |

OTHER PUBLICATIONS

Oracle, "Oracle8 Concepts Release 8.0," 1997 (Year: 1997).*

IBM i Version 7.3, Database Performance and Query Optimization, © Copyright IBM Corporation 1998, 2015., 720 pages.

Jonas Berg, Query Optimizing for On-line Analytical Processing Adventures in the land of heuristics, Aalto University School of Science Master's Programme in Computer, Communication and Information Sciences, Master's Thesis Espoo, May 22, 2017, 78 pages.

Obtaining a subset of the database state that would determine the outcome of its execution for a given sequence of SQL statements to be run on a RDBMS database, by using a proxy JDBC(TM) driver, An IP.com Prior Art Database Technical Disclosure, Authors et. al.: Disclosed Anonymously, IP.com No. IPCOM000226538D IP.com Electronic Publication Date: Apr. 15, 2013, 15 pages.

Method to Identify Hidden Performance Bottlenecks Of A Plurality Of SQL Statements And Transactions For Enhanced Database Performance Analysis And Tuning, An IP.com Prior Art Database Technical Disclosure, Authors et. al.: IBM Original Publication Date: Oct. 30, 2009, IP.com No. IPCOM000189196D, IP.com Electronic Publication Date: Oct. 30, 2009, 11 pages.

Nevarez, Benjamin; Optimizing Join Orders; www.banjaminnevarez.com/2010/06/optimizing-join-orders; 06/22/201; 5 pages.

Microsoft; Execution Plans; https://docs.microsoft.com/en-us/sql/relational-databases/performance/execution-plans?view=sql-server-ver15; Dec. 1, 2020; 3 pages.

* cited by examiner

```
SELECT *
FROM T1, T2
WHERE T1.C1 = T2.C1
  AND T1.C4 = ?
  AND T2.C2 > ?
```
300

| TABLE T1 | T1.C1   | T1.C2  | T1.C3   | T1.C4    | T1.C5 |
|----------|---------|--------|---------|----------|-------|
| T1.R1    | A20194  | John   | Jones   | $0       | 32    |
| T1.R2    | A30331  | Jane   | Jones   | $402.00  | 27    |
| T1.R3    | CW30255 | Thomas | Smith   | $0       | 2     |
| T1.R4    | BJW01322| Linda  | Philips | $35.44   | 10    |

305

| TABLE T2 | T2.C1   | T2.C2 | T2.C3 | T2.C4 | T2.C5   | T2.C6 |
|----------|---------|-------|-------|-------|---------|-------|
| T2.R1    | A10001  | 2018  | 04    | 22    | $31.99  | 90122 |
| T2.R2    | A30331  | 2018  | 04    | 12    | $402.00 | 90122 |
| T2.R3    | C20298  | 2017  | 11    | 30    | $201.44 | 53044 |
| T2.R4    | ZW40146 | 2018  | 01    | 08    | $8.56   | 32011 |
| T2.R5    | ZW40377 | 2016  | 01    | 08    | $0      | 10017 |

```
SELECT *
FROM  T1, T2
WHERE T1.C1 = T2.C1
  AND T1.C4 = ?
  AND T2.C2 > ?
```
500

```
WITH HINT1 (TABLE_NAME, JOIN_SEQ)
    AS (VALUES ('T1', 1), ('T2', 2))
SELECT *
FROM  T1, T2
WHERE T1.C1 = T2.C1
  AND T1.C4 = 0
  AND T2.C2 > 2017
```
505

```
WITH HINT2 (TABLE_NAME, JOIN_SEQ, JOIN_METHOD)
    AS (VALUES ('T1', 1, 'NULL'), ('T2', 2, 'NLJ'))
SELECT *
FROM  T1, T2
WHERE T1.C1 = T2.C1
  AND T1.C4 = 0
  AND T2.C2 > 2017
```
510

```
WITH HINT3 (TABLE_NAME, ACCESS_TYPE, ACCESS_NAME, JOIN_SEQ, JOIN_METHOD)
    AS (VALUES ('T1', 'RSCAN', 'NULL', 1, 'NULL'), ('T2', 'INDEX', 'T2IDX1', 2, 'NLJ')) )
SELECT *
FROM  T1, T2
WHERE T1.C1 = T2.C1
  AND T1.C4 = 0
  AND T2.C2 > 2017
```
515

FIG. 5

PERMUTATION-BASED MACHINE LEARNING FOR DATABASE QUERY OPTIMIZATION

BACKGROUND

The present invention relates in general to improving the performance of programming languages that allow users to specify a desired result without specifying steps necessary to return that result, and relates in particular to improved systems and methods for training a query optimization component of a database-management systems.

Certain types of programming languages achieve a degree of platform independence by allowing a user to specify a desired result from an application or system, allowing the application of system to select a particular sequence of steps for generating the desired result.

Users of a database-management system (DBMS), for example, may request stored data by submitting to the DBMS a query statement written in a query language like SQL (Structured Query Language). Such a query may identify data to be selected from the database and returned to the user in a particular structure or format, but not specify which internal steps should be used by the DBMS to satisfy the query.

For example, a simple query could specify that a user wishes to retrieve all records stored in a Customer table that identify customers who made a purchase during the last 30 days. But the query would not tell the DBMS which index of the Customer able should be used to retrieve those records, nor specify an order in which the DBMS traverses fields or records of the Customer table in order to identify the requested records.

More complex queries, such as a SQL query that comprises a JOIN operation, might assemble and return records that contain data retrieved from two or more tables. A database could, for example, contain a Customer table and a Purchases table. Here, the Customer table would contain records that each comprise fields describing characteristics of a customer, such as a Customer II) field, Customer Name, and Customer Address; and the Purchases table would store records that each comprise fields describing characteristics of a recent purchase, including the Customer ID of the customer that made that record's purchase.

If a JOIN query requests records that each describe characteristics of a customer who made a purchase during the last 30 days, each result record would combine fields retrieved from the Purchases table (which describe characteristics of the purchase, like purchase date and SKU number), with fields retrieved from the Customer table (which identify the purchasing customer's ID, name, and address). In this case, each result record would have joined fields from a record in the Customer table with fields from a record in the Purchases table, where the Customer record and the Purchases records both describe the same purchase activity.

In all these examples, the query statement does not attempt to direct the DBMS to use a specific sequence of steps (also known as a query plan) to satisfy the query. But there may be an enormous number of ways in which a complex query could be processed. For example, there may be millions of possible ways to satisfy a JOIN operation that retrieves records from several large tables. Each candidate query plan might comprise a different combination or permutation of table-traversal paths, access methods, table-access sequences, choices of keys or indexes, and other parameters.

The efficiency, response time, RAM usage, disk-storage requirements, processor utilization, and other types of resource-consumptions can vary enormously among candidate query plans of a single query. The efficiency of a plan can also be affected by factors specific to a particular database, including variables that may not be known until the query is actually processed.

For example, a query plan that attempts to select records from a table by means of an index defined by the database's schema would be more efficient than a plan that selects records by sequentially examining a non-index field of every record. Similarly, if one table contains a thousand times as many records as a second table, a plan that searches through every record of the larger table in order to select records from the smaller table would be less efficient than a plan that searches through every record of the smaller table in order to select records from the larger table.

Modern software applications incorporate optimization functionality that attempts to identify more efficient methods of responding to such instructions. In the case of DBMS systems and DBMS query languages, a query optimization component of the DBMS may respond to the receipt of a user query by attempting to identify a most efficient query plan before the DBMS begins to respond to the query. These optimizers can base their decisions on historical data, such as database statistics that periodically track the number of records in each table. In other cases, a query optimizer may be trained to select an efficient query plan by means of techniques of machine learning, which allow the optimizer to learn which types of query plans are likely to be more efficient by analyzing a "corpus" of training data consisting of the results of past queries.

Such a corpus may consist of application-specific or platform-specific training data. This type of data is intended to help the optimizer choose query plans most similar to the types of plans that have performed efficiently in the past. This type of training does not attempt to select a most efficient plan from the set of all possible plans, limiting the scope of the optimizer's machine intelligence.

SUMMARY

An embodiment of the present invention is a database-optimizer training system that includes a processor, a memory coupled to the processor, and a computer-readable hardware storage device coupled to the processor. The storage device contains program code configured to be run by the processor via the memory to perform a method for permutation-based machine learning for database query optimization. This method comprises the system receiving a set of data-access requests, where a first request of the received set of data-access requests specifies a first result to be retrieved from a database by a database-management system (DBMS) but does not specify a sequence of DBMS data-retrieval steps capable of generating the first result; the system enumerating a first set of candidate query plans, where each plan of the first set of candidate query plans identifies a distinct set of data-retrieval steps that, when performed by the DBMS, are capable of generating the first result, where each plan of the first set of candidate query plans specifies a distinct permutation that identifies one possible value of each parameter of the set of data-access parameters, and where no two plans of the first set of candidate query plans specify identical permutations; the system generating a first set of permuted data-access requests, where each permuted request of the first set of permuted data-access requests comprises the first received request and further comprises instructions directing the DBMS to use a corresponding plan of the first set of candidate query plans; the system replacing the first received request, in the received set of data-access requests, with the first set of permuted data-access requests; and the system using the updated set of data-access requests as a machine-learning corpus to train a query-optimization component of the DBMS.

Another embodiment of the present invention is a method for permutation-based machine learning for database query optimization. This method comprises receiving, by a database-optimizer training system, a set of data-access requests, where a first request of the received set of data-access requests specifies a first result to be retrieved from a database by a database-management system (DBMS) but does not specify a sequence of DBMS data-retrieval steps capable of generating the first result; enumerating, by the database-optimizer training system, a first set of candidate query plans, where each plan of the first set of candidate query plans identifies a distinct set of data-retrieval steps that, when performed by the DBMS, are capable of generating the first result, where each plan of the first set of candidate query plans specifies a distinct permutation that identifies one possible value of each parameter of the set of data-access parameters, and where no two plans of the first set of candidate query plans specify identical permutations; generating, by the database-optimizer training system, a first set of permuted data-access requests, where each permuted request of the first set of permuted data-access requests comprises the first received request and further comprises instructions directing the DBMS to use a corresponding plan of the first set of candidate query plans; replacing, by the database-optimizer training system, the first received request, in the received set of data-access requests, with the first set of permuted data-access requests; and using, by the database-optimizer training system, the updated set of data-access requests as a machine-learning corpus to train a query-optimization component of the DBMS.

Yet another embodiment of the present invention is a computer program product including a computer-readable storage medium storing computer-readable program code that is compatible with a database-optimizer raining system that includes a processor, a memory coupled to the processor, and a computer-readable hardware storage device coupled to the processor. The stored program code is configured to be run by the processor via the memory to perform a method for permutation-based machine learning for database query optimization. This method comprises the system receiving a set of data-access requests, where a first request of the received set of data-access requests specifies a first result to be retrieved from a database by a database-management system (DBMS) but does not specify a sequence of DBMS data-retrieval steps capable of generating the first result; the system enumerating a first set of candidate query plans, where each plan of the first set of candidate query plans identifies a distinct set of data-retrieval steps that, when performed by the DBMS, are capable of generating the first result, where each plan of the first set of candidate query plans specifies a distinct permutation that identifies one possible value of each parameter of the set of data-access parameters, and where no two plans of the first set of candidate query plans specify identical permutations; the system generating a first set of permuted data-access requests, where each permuted request of the first set of permuted data-access requests comprises the first received request and further comprises instructions directing the DBMS to use a corresponding plan of the first set of candidate query plans; the system replacing the first received request, in the received set of data-access requests, with the first set of permuted data-access requests; and the system using the updated set of data-access requests as a machine-learning corpus to train a query-optimization component of the DBMS.

BRIEF DESCRIPTION OF THE DRAWINGS

FIG. 3 shows elements associated with a database query that requests records formed by joining fields of two database tables.

FIG. 5 shows examples of SQL queries that may be used to implement permutations of a received data-access request as described in FIG. 4.

DETAILED DESCRIPTION

Figure 1:
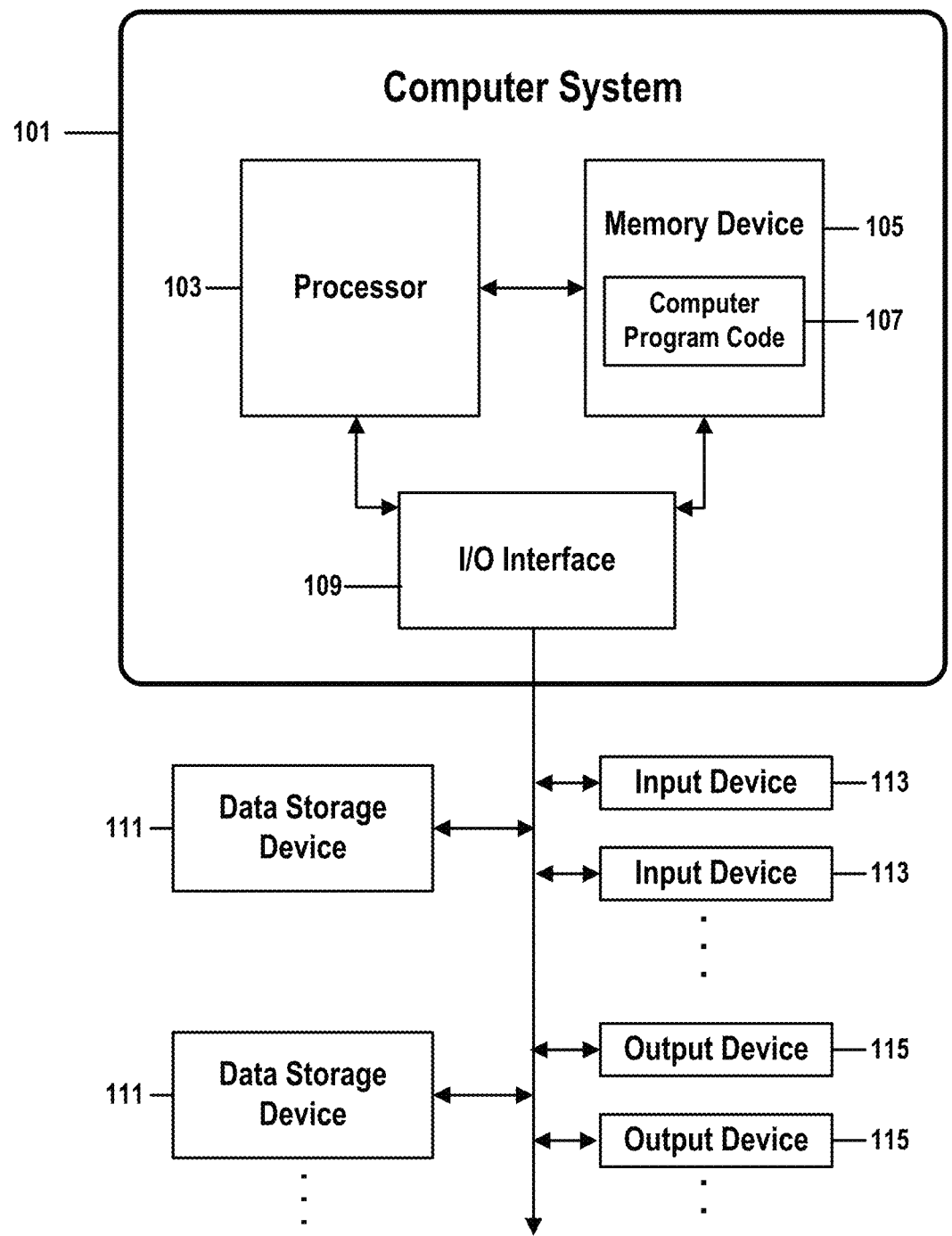
FIG. 1 shows the structure of a computer system and computer program code that may be used to implement a method for permutation-based machine learning for database query optimization, in accordance with embodiments of the present invention.

Embodiments of the present invention improve upon DBMS technology by providing methods and systems for more efficiently and effectively training query optimization components.

When a user submits a query to a DBMS, the query specifies the content and structure of the database data that the user wishes to access, but does not specify the manner in which the DBMS should access, select, and sort the data. As will be explained below, each DBMS system may satisfy common queries in many different ways, and these different methods (known as query plans) can vary significantly in response time and resource utilization. Modern DBMS systems thus employ query-optimization modules that attempt to choose a more efficient query plan in response to the receipt of a query, and then direct the DBMS to use that query plan when satisfying the query.

Query optimization is generally no more than an approximation method that merely strives to select a relatively efficient query plan. Because millions, or even billions, of possible query plans may be associated with a particular class of queries, an optimizer cannot evaluate every candidate plan without compromising the real-time response time required by most database systems.

For this reason, query optimizers are often "trained" off-line to recognize more efficient query plans by means of known methods of machine-training. Such an optimizer might be fed a "corpus" of training data that contains information about the performance of various types of query plans when satisfying previous queries of the database. A corpus is generally very large, since increasing the amount of training to which an optimizer module is subjected increases the ability of the optimizer to make more successful selections.

One drawback to this method is that the relative efficiency of a query plan is generally implementation-dependent, and may depend on factors such as the internal operation of the database-management system, the schema of the database, the relative number of records in each table, and the extrinsic applications that determine which queries are most often submitted to the DBMS.

Therefore, in order for the corpus to be relevant, the training data comprised by the corpus is best gathered from real-world production runs of the database or application that comprises the optimizer. This, however, artificially constrains the machine-learning process to classes of query plans that the DBMS had been selecting prior to the training. If there are classes of query plans that are far more efficient than those the DBMS has already been using, the optimizer will not be trained to recognize them.

Embodiments of the present invention address this problem by providing an improvement to the technology of training query-optimization applications. The invention evaluates each class of query specified by a training corpus, generates all possible query plans for all possible variations of the query, and adds these variations to the corpus, regardless of whether the DBMS has ever in the past employed any of these generated query plans.

The embodiments then return the corpus to the machine-training module of the DBMS, which determines the relative efficiency of each query plan in the corpus and uses the resulting information to better train the optimizer. In this manner, the DBMS may be able to identify new classes of more efficient query plans because the DBMS's query-optimization module has been trained to identify and select query plans that the DBMS has never employed in the past.

Examples and embodiments described in this document will, for pedagogical purposes, discuss one class of applications of the present invention, viz., the training of a query-optimization module of a relational database-management system that accepts queries written in the SQL (Structured Query Language) query language. This should not be construed to limit embodiments of the present invention to such embodiments and examples.

Other embodiments of the present invention that conform to the invention's underlying inventive concept may comprise methods of improving the training of any module of any application that must in a similar manner select a method satisfying a data request that does not specify or require a specific manner of satisfaction.

For example, a search engine that receives a search request as a set of search terms interprets that request as a request for records that contain the search terms. In general, there are a very large number of ways in which the search engine may search through thousands of heterogeneous data sources in order to satisfy the request. If an optimization module comprised by the search engine is capable of identifying more efficient search methodologies capable of satisfying the request, that module must have been trained in some way to understand the relative efficiency of each type of search methodology. In such a case, embodiments of the present invention can be used to improve methods of machine-learning used to train the search-engine optimization module.

Other embodiments may comprise applications as diverse as multimedia-content delivery systems, social-media services, and computerized communications infrastructures that must retrieve data from distributed network-attached repositories. Many such embodiments are possible in a variety of fields and, in particular, comprising any application that must satisfy user requests that identify data items that should be returned to the user, but do not specify an algorithm or method by which the request data should be selected, accessed, or structured.

All these embodiments share the same underlying inventive concept:

i) an application or platform responds to a request that specifies a desired result, but does not specify the manner in which the result should be generated;

ii) an optimizer module or component attempts to identify an efficient manner in which the application or platform should generate the desired result and directs the application or platform to use the identified method;

iii) the optimizer possesses the expertise required to make such an identification by means of machine-learning procedures, in which the optimizer is trained by the submission of a corpus of test data; and iv) the contents of the corpus are created by a module that generates all possible permutations of a subset of past user requests, such that the optimizer is trained to select an efficient method of satisfying a user query, regardless of whether that method was ever used by the application or platform in the past.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable rage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for permutation-based machine learning for database query optimization in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for permutation-based machine learning for database query optimization in accordance with embodiments of the present invention, and may implement other embodiments described in this specification, including the methods illustrated in FIGS. 1-5. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for permutation-based machine learning for database query optimization.

Any of the components of the present invention could be created, integrated, hosted, maintained, deployed, managed, serviced, supported, etc. by a service provider who offers to facilitate a method for permutation-based machine learning for database query optimization. Thus the present invention discloses a process for deploying or integrating computing infrastructure, comprising integrating computer-readable code into the computer system 101, wherein the code in combination with the computer system 101 is capable of performing a method for permutation-based machine learning for database query optimization.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 107 for a method for permutation-based machine learning for database query optimization may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for permutation-based machine learning for database query optimization is integrated into a client, server and network environment by providing for program code 107 to coexist with software applications (not shown operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter first required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
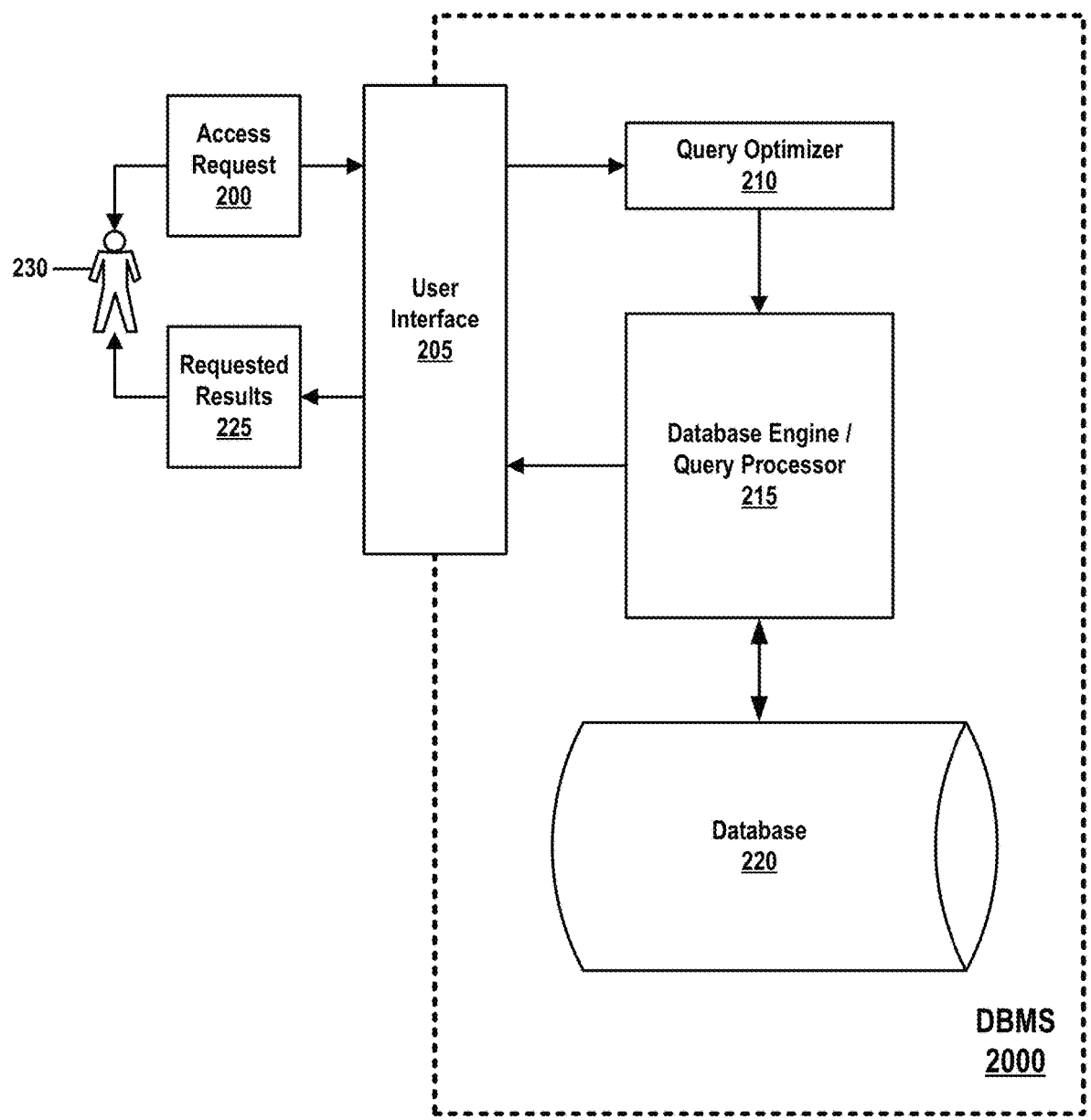
FIG. 2 shows components of a database-management system configured with query-optimization functionality.

FIG. 2 shows components of a database-management system (DBMS) 2000 configured with query-optimization functionality. FIG. 2 comprises elements identified by reference numbers 200-230 and 2000.

FIG. 2 shows a simplified structure of relational database-management system 2000 that includes a database engine/query processor 215, which manages access to a database 220 that stores data organized, according to a structure known as a schema, into tables like those shown in FIG. 3. FIG. 2 is intended to provide one example of a platform on which embodiments of the present invention may be implemented. As described above, this example should not be construed to limit embodiments to relational DBMS systems or to database-management applications in general.

In normal operation of DBMS 2000, a user 230 accesses data stored in database 220 by submitting an access request 200 through a user interface 205. In certain embodiments and examples described in FIGS. 3-4, an access request 200 may be part of a set of training, test, or verification data. For example, an access request 230 could be a request to access data stored in a relational database or in a transaction log of a transaction-processing system. In another case, an access request 230 could be part of a corpus submitted to a query-processing component of an application as part of a machine-learning function. In such cases, the access request 230 could emulate a single real-world request made to the application or could represent an entire class or category of real-world requests.

In other cases, access request 200 may be part of a body of test data submitted to an application for purposes of measuring the application's response times, resource consumption, or other efficiency or performance issue of interest under various conditions. Access request 200 may also be part of a body of verification data submitted to an application for purposes like verifying that the application produces correct output, estimating the cost of certain query plans, detecting errors in the application or in a data repository accessed by the application, or confirming that certain types of access request produce expected results.

An access request 200 may comprise any formatting convention or standard known in the art, but in the example of FIG. 2, request 200 is a database query formatted in SQL language. In all embodiments, regardless of the format or convention of access request 200, and regardless of whether the embodiment is implemented as a module of a relational DBMS, the access request 200 describes a desired result, but does not need to specify specific steps that must be taken to produce the desired result.

In one example of an access request 200 that requests access to data of an e-commerce system, rather than of a relational database, an access request that requests a customer's monthly billing summary, specifying which types of data items should be included in the summary, would not direct the e-commerce system to retrieve those items from any particular set of data sources, in any particular sequence of data-access operations, or by means of any particular types of data-access methods.

The access request 200 is forwarded by user interface 205 to a query optimizer 210 or other functionally similar component of system 2000. Optimizer 210 selects a desirable method (in this example, a desirable "query plan") of satisfying the access request 200 from what may be a large number of candidate query plans. In current implementations, where there may be too many candidate query plans to allow optimizer 210 to evaluate every possible plan, the selected query plan may not be the most efficient plan.

Optimizer 210 then directs the query processor component of database engine 215 to generate the results requested by access request 200, by means of steps specified by the efficient query plan identified by optimizer 210. Database engine 215 returns the generated results 225 to user 230 via interface 205.

FIG. 3 shows elements associated with an SQL database query 300 that requests records formed by joining fields of two database tables T1 305 and T2 310. FIG. 3 comprises elements identified by reference numbers 300-310.

As has been noted above, although FIG. 3 shows an SQL query 300 that operates on two tables of a relational database (such as database 220 of FIG. 2), this example should not be construed to constrain the scope of the present invention. Embodiments of the present invention may comprise access requests made upon other types of applications and software systems, so long as the access request s of a type that specifies a result, but does direct the application or system to perform specific steps in order to generate and return the specified result.

Table T1 305 consists of one million records or rows and five columns T1.C1 . . . T1.C5. The first four rows, T1.R1 . . . T1.R4, are shown. As can be seen in FIG. 3, a row of T1 305 contains five fields and the five fields of each row each store at most one instance of a corresponding column of T1 305.

Similarly, Table T2 310 consists of one million records or rows, and six columns T2.C1 . . . T2.C6. FIG. 3 shows the first five rows, T2.R1 . . . T2.R5. As can be seen in FIG. 3, a row of T2 310 contains six fields and the six fields of each row each store at most one instance of a corresponding column of T2 310.

In this example, each record of table T1 305 stores data related to one customer account, and the five fields of each record store, respectively, a particular customer's account number, the customer's first name, the customer's last name, the customer's outstanding balance, and the numbers of months since the customer opened the account.

Similarly, in this example, each record of table T2 310 stores data related to one transaction or purchase, and the six columns of each record store, respectively, a purchasing customer's account number, a purchase-date year, a purchase-date month, a purchase-date day, a purchase amount, and a billing Zip code associated with a purchase.

SQL query 300 begins with the instruction SELECT * FROM T1, T2. This instruction requests a set of rows, each of which contains fields of one row of T1 and of a corresponding row of T2. The "*" operator indicates that all fields in the two rows should be returned.

The WHERE clause sets conditions for selecting each pair of records from the two tables. Here, the condition "T1.C1=T2.C1" states that a T1/T2 pair of records should be returned only when the first column of a T1 record and the first column of a T2 record contain identical data. The "T1.C4=?" clause indicates that a row of table T1 should be considered only if column C4 of that row contains a literal value represented by a question mark. Similarly, the "T2.C2>?" clause indicates that a row of table T2 should be considered only if column C2 of that row contains a value greater than a literal value represented by a question mark. As described in a later example, the question marks will be replaced by appropriate literal values when the query is processed.

In a limited example based on the four rows of T1 and the five rows of T2 shown in FIG. 3 and on the first condition of the WHERE clause, this condition results in the selection of one pair of records: T1.R2 from table T1 305 and T2.R2 from table T2 310. This pair is selected because column 1 of T1.R2 and column 1 of T2.R2 both contain the same data item "A30331." In this limited example, no other record of T1 305 shown in FIG. 3 contains column 1 data that is identical to column 1 data of any record of T2 310 that is shown in FIG. 3.

The SQL command thus returns only one record, which contains all eleven distinct fields of records T1.R2 and T2.R2:

A30331   A30331   Jane   Jones   $402.00   27   2018   04   12   $402.00   90122

If this SQL query is submitted as an access request 200 to DBMS 2000, Query Processor 215 requires a function like that of query optimizer 210 to determine how to most efficiently service the query. Without such an optimization function, the DBMS system may attempt to generate the requested results 225 in an inefficient manner, by performing a less-efficient query plan.

SQL query 300 does not specify a query plan. A query plan (or "execution plan") is a set of steps that a system executes in order to satisfy a data-access request. A query plan is required because, although a query may identify the results of the query, the query does not tell the database the exact logic flow to use.

A query plan is made up of one or more execution steps that each describes one or more operations required to generate results specified by the query.

A query plan can also specify the logical flow between such operations. In simple cases, operations are performed in sequential order, with the output of one step becoming input for the next step. But more complex query plans may comprise complex logic that includes conditional branches or specifies alternative data sources.

A query plan is deemed to be less efficient, or to have a higher "cost," if the plan takes longer to complete or requires greater consumption of resources, such as processor power, RAM, disk storage, network bandwidth, or CPU I/O. Many ways of estimating execution costs are known in the art, including those based on database statistics, such as table row counts. For example, if a table containing ten rows must be joined with a table that contains 10,000 rows, the time, processor power, and I/O required to read all fields of the first table and to then use that information to make ten queries into the second table is much less than the time and resources required to read all fields of the second table and to then use that information to make 10,000 queries into the first table. In another example, a query plan that accesses records of a table by using an existing index is more efficient (all other things equal) than a plan that accesses records by searching through non-index fields.

Query plans can also vary in other ways, such as by access method or join method. Many access methods and join methods are known in the art, and the particular methods that are viable for a particular application, query format, system, or platform may be implementation-dependent. For example, in popular database-management systems capable of executing SQL queries, common join methods include nested-loop joins (NLJ), sort merge joins (SMJ), hash joins, and hybrid joins (HBJ). Common access methods include rscans (relational scan) or tablespace scans, limited partition scans (also known as partition-level rscans), and index scans.

Embodiments of the present invention are flexible enough to accommodate any combination of these and other known access methods and join methods known in the art, as desired by an implementer or required by an application, platform, or computing environment. As will be described in FIG. 4, embodiments are also flexible enough to accommodate other implementation-depending parameters capable of being varied among candidate query plans.

A limited example that illustrates how query plans may differ in efficiency is based on the SQL query 300, a table T1 305 that has one million rows and a table T2 310 that has one million rows. 1% (10,000) of the rows of T1 305 contain values of T1.C4 that satisfy a condition of matching a first specified literal value of $100, and 80% (800,000) of the rows of T2 310 contain values of T2.C2 that satisfy a condition of being greater than a second specified literal value of 2016. Furthermore, this exemplary implementation of DBMS 2000 supports two possible access methods: rscan and index scan.

This results in a first set of viable query plans that comprise: a join sequence that joins data retrieved from table T1 305 to data previously retrieved from table T2 310 (rather than joining T2 310 to T1 33); an SMJ join method; a requirement to satisfy conditions generated by substituting literal values $100 and 2016, respectively, into the T1.C4=? AND T2.C2>? conditions; and varying access methods. These plans might include:

1) Using an rscan access method to access records of both T1 and T2:
  an rscan access of T1 scans 1,000,000 complete rows to determine that 10,000 rows satisfy the T1.C4=$100 condition. This is NOT an efficient way to return 1% of the rows in T1.
  an rscan access of T2 scans 1,000,000 complete rows to determine that 800,000 rows satisfy the T2.C2>2016 condition. Because this method has such a high return rate, this is an efficient way to return 80% of the rows.
  the SMJ join method requires both results to be sorted in order for the SMJ algorithm to perform match/merge style join operations. This is an appropriate join method given the access methods to T1 & T2, but may be somewhat inefficient due to the low % of T1 records that were qualified.
  Summary: the (T1, T2) join sequence is reasonably efficient, given the % of rows qualified returned, but rscan is an inefficient access method for T1 and the SMJ join method may be relatively inefficient because of the low % of qualifying rows selected from table T1.

2) Using an index scan access method for T1 (which scans index T1.C2) and an rscan access method for T2:
  the index scan on T1.C4 quickly identifies the 10,000 qualifying rows that satisfy the T1.C4=$100 condition. This is a more efficient way to identify 1% of the records in T1 because the index scan needs to read only the index of each record, not the entire record.
  the rscan access of T2 again scans 1,000,000 complete rows to determine that 800,000 rows satisfy the T2.C2>2016 condition. As before, this method is a relatively efficient way to select 80% of the rows.
  the SMJ join method again must sort sets of results in order to perform its join operations.
  Summary: the (T1, T2) join sequence is efficient, given the % of rows qualified in each table, the access methods for both T1 and T2 are efficient, but the SMJ join method may not be efficient, given low % of rows qualified from T1.

3) Using an rscan access method for T1 and an index scan access method for T2 (which scans index T2.C2):
  the rscan of T1 scans 1,000,000 complete rows to determine that 10,000 rows qualify the T1.C4=$100 condition. This is an inefficient way to return 1% of the rows in T1.
  performing an index scan on T2.C2>2016 identifies the 800,000 qualifying rows. This is not an efficient way to read 80% of the rows because the index scan reads both 80% of the index values and 80% of the table rows.
  the SMJ join method requires both sets of results to be sorted in order for the SMJ algorithm to perform a match/merge style join.
  Summary: the (T1, T2) join sequence is again efficient, given the % of rows qualified in each table, the SMJ join sequence given the of rows qualified, the access method for T1 is relatively inefficient, the access method for T2 is relatively efficient, and the SMJ join method may not be efficient, given the low % of qualifying rows in T1.

4) Using an index scan access method for both table T1 (which, in this example, scans index T1.C4) and table T2 (which scans index T2.C2):

Summary: as before, the (T1, T2) join sequence is efficient, the index scan of T1 is relatively efficient, the index scan of T2 is inefficient, and the SW join method is relatively inefficient.

These conclusions may be made by any person skilled in a field comprised by the applications or systems (in these examples, relational DBMS systems) comprised by the embodiment. The relative efficiency of results may be ranked by means known in the art by considering the resource-consumption, estimated response times, and other implementation-dependent costs associated with each candidate query plan. The means of estimating costs may, for example, be inferred from system logs that record transaction times and system utilizations.

In a general case, many more query plans may exist that are capable of satisfying query 300. Each query plan may comprise a different permutation or combination of join sequences, access methods, join methods, and any other parameters specific to the application or system that comprises the embodiment. When a query comprises more complex operations, such as joining larger numbers of tables, specifying conditional operations, or accessing complex data structures, the number of viable candidate query plans can become quite large.

The total number of viable query plans can skyrocket when queries are included in a corpus used for offline training of an optimizer 210. Consider, for example, a variation of access request 300 that includes an extended WHERE clause contains additional conditions or where the SELECT clause specifies a larger number of tables.

Known methods of training an optimizer 210 cannot easily generate test SQL requests of this nature that are representative of access requests that the optimizer 210 will be expected to process during production operation.

For practical purposes, a corpus of training data intended for an optimizer component 210 of a DBMS 2000 will generally comprise only the most common access requests 200, where those common requests may be identified by logs that record the past transactions performed by the DBMS 2000.

Many of the most common types of transactions, however, cannot be represented with complete accuracy because they may vary in minor ways. For example, in an e-commerce system, users or other applications might commonly request information about a recent purchase, where the purchase was made after a certain date and where the unpaid balance of that transaction exceeds a certain amount. An enormous number of variations of this type of request may have been logged, each of which differs only by its specified date and balance.

Using this data to train an optimizer 210 is problematic because it may be prohibitively expensive to include every logged variation in the corpus, many of which are likely to incur costs so similar as to be redundant. However, including a simplified version of the access request that does not include the date an balance conditions would produce unrealistic results that might not accurately reflect real-world costs.

Embodiments of the present invention address this issue by generating permutations of such a training access request based on a subset of representative values of each literal. In the running example, an SQL request to join tables T1 and T2, subject to the conditions described above, might be received by an embodiment of the present invention as an SQL query that contains the WHERE clause shown in Equation (1):

WHERE T1.C1=T2.C1 AND T1.C4=? AND
T2.C2>? (1)

The embodiment would determine a first set of representative values for T1.C4 and a second set of representative values for T2.C2, generate a set of viable queries that each specify one permutation of a representative value of T1.C4 and a representative value of T2.C2, and then insert those permutations into the corpus.

The representative values may be selected by any means known in the art and preferred by an implementer. For example, if T2.C2 specifies a year, and if table T2 contains values of T2.C2 that vary between 1999 and 2018, the embodiment may select representative values as functions of a set of values of T2.C2 stored in table T2. Examples of such a function might be the maximum, minimum, median, mean, or most common value of the set. Representative values might also be selected as similar functions of a set of values of T2.C2 comprised by past access requests, as recorded by a transaction-logging module of the DBMS 2000.

In cases like these, all possible permutations of the representative values will be enumerated. For example, if the representative values of T1.C4={$0, $10, $100} and the set of representative values of T2.C2={2018, 2017}, then the embodiment would consider queries that comprise the permutations:

| T1.C4 | T2.C2 |
|---|---|
| $ 0 | 2018 |
| $ 0 | 2017 |
| $ 10 | 2018 |
| $ 10 | 2017 |
| $100 | 2018 |
| $100 | 2017 |

These variables would be added to the parameters already discussed in FIG. 3 above. For example, if the query 300 of FIG. 3 generates 2000 possible access requests, adding permutations of the two additional constraints on T1.C4 and T2.C2 to each generated request would create six distinct access requests from each of the 2000 previously generated requests. This would result in a total of 12,000 generated access requests.

In some embodiments, the permutations of the representative values of T1.C4 and T2.C2 would generate twice as many ordered pairs, if the order in which the two conditions placed on T1.C4 and T2.C2 are evaluated would generate different costs. For example, one query might comprise the clause:

WHERE T1.C1=T2.C1 AND T1.C4=0 AND
T2.C2>2017 and a distinct second query might comprise the clause:

WHERE T1.C1=T2.C1 AND T2.C2>2017 AND
T1.C4=0

Figure 4:
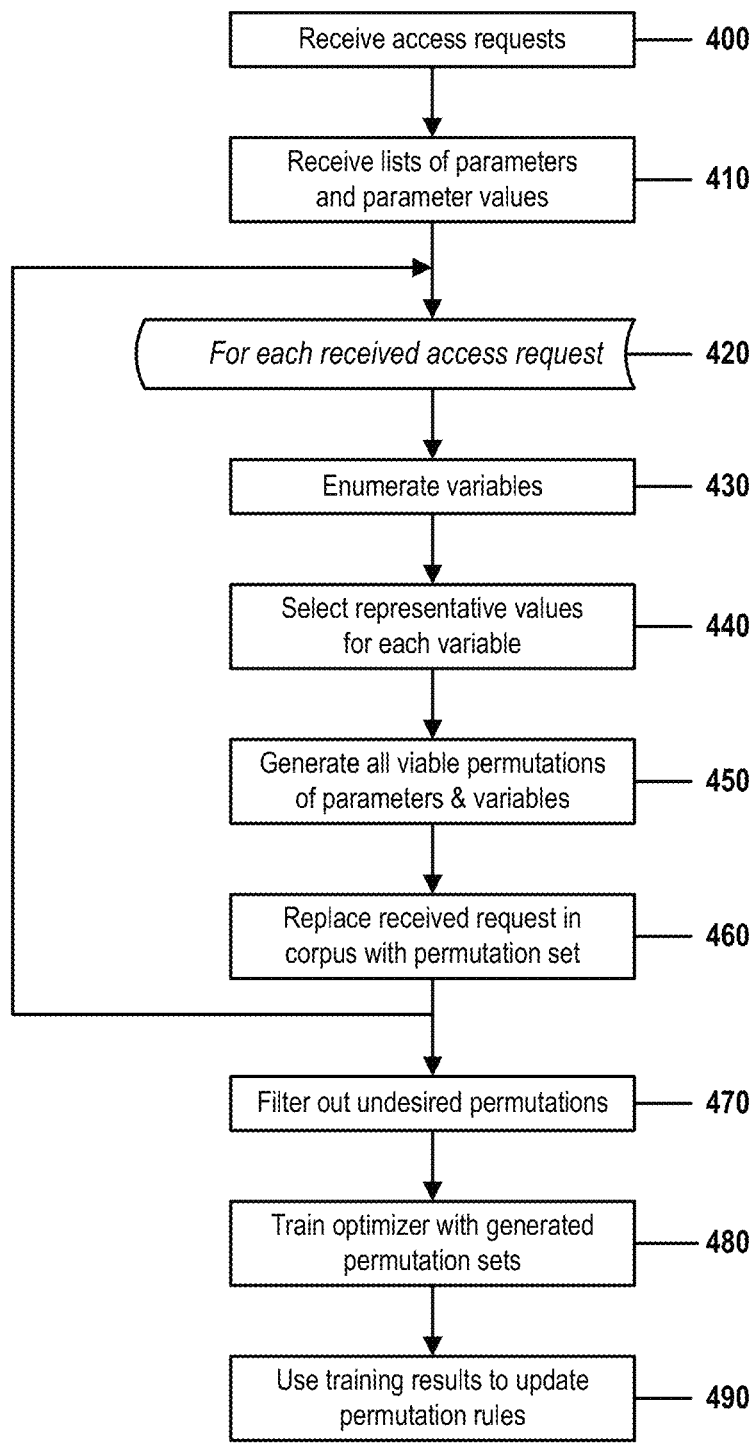
FIG. 4 is a flow chart that illustrates the steps of a method for permutation-based machine learning for database query optimization in accordance with embodiments of the present invention that incorporate components analogous to those of FIGS. 1-2.

Methods and systems for performing these operations are described in greater detail in FIG. 4.

FIG. 4 is a flow chart that illustrates the steps of a method for permutation-based machine learning for database query optimization in accordance with embodiments of the present invention that incorporate components analogous to those of FIGS. 1-2. FIG. 4 contains steps 400-490.

In step 400, an optimization module 210 of a data-accessing system receives a set of access requests 200. As described in FIG. 2, these requests 200 may be a request received from a user or other application during normal operation of the system, may be received as a corpus of training data for use in a machine-learning operation, or be comprised by test data used to benchmark, verify, or otherwise qualify performance, efficiency, or other characteristics of the system. In some embodiments, a distinct query-generating application may automatically generate the set of access requests 200 as a function of characteristics of a schema or data structure of the data set to be accessed, or as a function of logs or records of past queries or of historical performance figures of the data-accessing system.

Embodiments and examples described in FIG. 4 will discuss one class of embodiments of this inventive concept, in which the data-accessing system is a DBMS 2000 and the requests 200 are part of a corpus of machine-learning training data produced through rscans known in the art for the purpose of training a query optimizer component 210 of the DBMS 2000. Similarly, access requests 200 will be described in this document as SQL queries.

As mentioned previously, these examples and embodiments should not be construed to limit embodiments of the present invention to a single class of implementations. The inventive concept underlying the embodiments of FIG. 4 is flexible enough to encompass any sort of data-accessing application or system that supports any access-request format, convention, or language capable of specifying a desired result without specifying a particular set of steps that should be used to generate the desired result. The concept is also flexible enough to support uses other than for the purpose of machine-training an optimizer 210, including any use that comprises determining relative performance, efficiency, or accuracy of the data-accessing application or software when selecting different types of execution plans in response to receipt of an access request 200.

In the most general case, a received access request 200 may be a completely specified request, such as the SQL query 300 of FIG. 3. In some embodiments, a received request 200 may represent a class of access requests, rather than a single access request, by including implementation-dependent placeholders, such as the question-mark placeholders shown in the exemplary SQL code of Equation (1). As described above in FIG. 3, each placeholder represents a variable that would normally be assigned a literal value only when an actual access request is received or executed. In FIG. 4, the system in steps 430-460 expands each such received request 200 into multiple access requests that each replace the request's placeholder variables with a set of representative literal values.

In step 410, the system receives a list of parameters that may vary among execution plans capable of serving the received access requests 200. The system also receives lists of each value that each received parameter can assume.

In the running example of FIG. 4, the system is a particular type of relational database-management system capable of responding to a SQL-formatted JOIN request 200 with query plans that vary in three ways: i) the sequence or order in which each table is accessed; ii) each access method used to access data in each table; and iii) the join method used to join the results of each table access.

In this example, DBMS 2000 supports two access methods known in the art (rscans and index scans), and two join methods known in the art (NLJ and SMJ). Many other combinations of parameters and combinations of supported values of each parameter are known in the art.

Step 420 begins an iterative procedure of steps 420-460, which is performed by the system once for each access request received in step 200.

In step 430, the system identifies any variables comprised by the current access request 200, each of which is represented by a placeholder in the current access request 200. This identification may be performed by any means known to the art or as a function of an implementer's expert knowledge of the system, its operating environment, the data stored by the system, or the business function performed by the system. In the relatively simple running example, the system may in this step identify each variable by searching the access request 200 for known placeholders or templates (such as the question marks of Equation (1)) and associating each placeholder or template with an entity associated with the placeholder or template by a logic operator.

For example, in Equation (1), the system would interpret the clause "T1.C4=?" as referencing a variable value of the fourth field of a row of table T1, and would interpret the clause "T2.C2>?" as referencing a variable value of the second field of a row of table T2.

In step 440, the system selects representative values for each variable (if any) identified in step 430. As described in FIG. 3, this selection may be performed by any means known in the art, including selecting maximum, minimum, or average values of the variable stored in an existing database or enumerated by a log file. In more complex examples, the system might refer to a database or knowledgebase schema in order to identify values of a variable that are stored in multiple tables, or might reference a histogram that defines a distribution of stored values of a variable in order to select values of the variable that occur most frequently.

In step 450, the system generates a set of access requests that each add one distinct permutation of parameter values and variable values to the received request 200.

For example, if the system received in step 400 access request 500 of FIG. 5 (which is based on exemplary SQL query 300 and Equation (1)), the system would in step 450 generate a set of permutations of request 500 that each comprise one distinct permutation of table sequences, access methods, join methods, representative values of T1.C4, and representative values of T2.C2.

If the system in step 440 selected three representative values of T1.C4 (0, 25, 100) and two representative values of T2.C2 (2017, 2018), the system would in step 450 generate 48 possible permutations (permutations of two sequences, two access methods, two join methods, three values of T1.C4, and two values of T2.C2), each of which specifies one candidate query plan.

If the same access method is used for both tables, the possible permutations are:

TABLE 1

| Query Plan | Table Sequence | Access Method | Join Method | T1.C4 | T2.C2 |
|---|---|---|---|---|---|
| 1 | T1, T2 | rscan | NLJ | 0 | 2017 |
| 2 | T1, T2 | rscan | NLJ | 0 | 2018 |
| 3 | T1, T2 | rscan | NLJ | 25 | 2017 |
| 4 | T1, T2 | rscan | NLJ | 25 | 2018 |
| 5 | T1, T2 | rscan | NLJ | 100 | 2017 |
| 6 | T1, T2 | rscan | NLJ | 100 | 2018 |
| 7 | T1, T2 | rscan | SMJ | 0 | 2017 |
| 8 | T1, T2 | rscan | SMJ | 0 | 2018 |

TABLE 1-continued

| Query Plan | Table Sequence | Access Method | Join Method | T1.C4 | T2.C2 |
|---|---|---|---|---|---|
| 9 | T1, T2 | rscan | SMJ | 25 | 2017 |
| 10 | T1, T2 | rscan | SMJ | 25 | 2018 |
| 11 | T1, T2 | rscan | SMJ | 100 | 2017 |
| 12 | T1, T2 | rscan | SMJ | 100 | 2018 |
| 13 | T1, T2 | index scan | NLJ | 0 | 2017 |
| 14 | T1, T2 | index scan | NLJ | 0 | 2018 |
| 15 | T1, T2 | index scan | NLJ | 25 | 2017 |
| 16 | T1, T2 | index scan | NLJ | 25 | 2018 |
| 17 | T1, T2 | index scan | NLJ | 100 | 2017 |
| 18 | T1, T2 | index scan | NLJ | 100 | 2018 |
| 19 | T1, T2 | index scan | SMJ | 0 | 2017 |
| 20 | T1, T2 | index scan | SMJ | 0 | 2018 |
| 21 | T1, T2 | index scan | SMJ | 25 | 2017 |
| 22 | T1, T2 | index scan | SMJ | 25 | 2018 |
| 23 | T1, T2 | index scan | SMJ | 100 | 2017 |
| 24 | T1, T2 | index scan | SMJ | 100 | 2018 |
| 25 | T2, T1 | rscan | NLJ | 0 | 2017 |
| 26 | T2, T1 | rscan | NLJ | 0 | 2018 |
| 27 | T2, T1 | rscan | NLJ | 25 | 2017 |
| 28 | T2, T1 | rscan | NLJ | 25 | 2018 |
| 29 | T2, T1 | rscan | NLJ | 100 | 2017 |
| 30 | T2, T1 | rscan | NLJ | 100 | 2018 |
| 31 | T2, T1 | rscan | SMJ | 0 | 2017 |
| 32 | T2, T1 | rscan | SMJ | 0 | 2018 |
| 33 | T2, T1 | rscan | SMJ | 25 | 2017 |
| 34 | T2, T1 | rscan | SMJ | 25 | 2018 |
| 35 | T2, T1 | rscan | SMJ | 100 | 2017 |
| 36 | T2, T1 | rscan | SMJ | 100 | 2018 |
| 37 | T2, T1 | index scan | NLJ | 0 | 2017 |
| 38 | T2, T1 | index scan | NLJ | 0 | 2018 |
| 39 | T2, T1 | index scan | NLJ | 25 | 2017 |
| 40 | T2, T1 | index scan | NLJ | 25 | 2018 |
| 41 | T2, T1 | index scan | NLJ | 100 | 2017 |
| 42 | T2, T1 | index scan | NLJ | 100 | 2018 |
| 43 | T2, T1 | index scan | SMJ | 0 | 2017 |
| 44 | T2, T1 | index scan | SMJ | 0 | 2018 |
| 45 | T2, T1 | index scan | SMJ | 25 | 2017 |
| 46 | T2, T1 | index scan | SMJ | 25 | 2018 |
| 47 | T2, T1 | index scan | SMJ | 100 | 2017 |
| 48 | T2, T1 | index scan | SMJ | 100 | 2018 |

In practice a real-world access request may comprise larger numbers of parameters, parameter values, variables, and representative values of each variable, resulting in rapidly increasing numbers of possible permutations. For example, in some embodiments, even more permutations would be generated if the embodiment's implementation of an indexed access method is capable of accessing data by more than one index. And in an embodiment in which a permutation may specify a distinct access method and a distinct join method for each table to be joined, the number of permutations shown in Table 1 would quadruple to 192.

Each permutation of the received access request 200 may be generated by any means known in the art. For instance, in the SQL-based examples of FIG. 4, a specific query plan may be partially identified by adding a HINT statement to the received request 200. Although infrequently used, HINT commands allow an SQL query to specify certain elements of a query plan.

For example, the access request 500 of FIG. 5 may be modified to generate permutation 505, which specifies a join sequence of (T1, T2) and representative values of T1.C4=0 and T2.C2=2017. Exemplary permutation 505 uses a WITH clause to add a HINT1 condition to query 500 that specifies that table T1 should be the first table in the join sequence and that table T2 is the second table in the sequence. This syntax is known in the art to developers with knowledge of the SQL language.

Exemplary permutation 510 adds a second condition as HINT2, which that identifies a join method for each table. Here, the argument ('T1', 1, 'NULL') specifies that table T1, because it is the first table in the join sequence, cannot be joined to data that had been retrieved from another table. Argument ('T2', 2, 'NLJ')) specifies that table T2 is the second table in the join sequence and is to be joined to data retrieved from Table T1 by an NLJ join method.

Finally, exemplary SQL query 515 comprises a HINT3 clause that specifies a full permutation of values of the parameters and variables shown in Table 1. Here, the HINT3 argument ('T1', 'RSCAN', NULL, 1, SMJ) specifies that T1 is to be accessed by an rscan access method that is identified by a "NULL" access name, T1 is the first table in the join sequence, and T1 cannot be joined to any previously retrieved data. Argument ('T2', 'INDEX', 'T2IDX1', 2, 'NLJ')) specifies that table T2 is to be accessed by an index scan access method that is identified by the name "T2IDX1", T2 is the second table in the join sequence, and T2 is to be joined to data retrieved from table T1 by an NLJ join method.

In step 460, the access request 200 received in step 400 and being evaluated by the current iteration of the iterative procedure of steps 420-460 is replaced in the received set of requests by the set of permutations generated in step 450. If any of the received access requests 200 have not yet been processed by an iteration of the iterative procedure of steps 420-460, the iterative procedure of steps 420-460 then repeats in order to process the next unprocessed request 200. In some embodiments, step 460 is not performed until step 470 (and the last iteration of the iterative procedure of steps 420-460) is completed.

In some embodiments, the system performs step 470 at the conclusion of the last iteration of the iterative procedure of steps 420-460. In step 470, the system filters out any access requests generated in step 450 that the system deems to be impractical, unlikely to be received in real-world operation, internally inconsistent, or otherwise not viable for use as training or test data.

If a non-viable permutation query has in step 460 been stored in the set of access requests, the system here deletes the non-viable permutation from the set. If the non-viable permutation query has not yet been stored in the set of received access requests, the system in step 470 deletes the non-viable permutation from the set of generated permutations prior to storing the non-viable permutation in the set of received access requests.

Not all embodiments will perform step 470, but when included, this filtering can increase the efficiency of an embodiment's training, testing, or verification operations by reducing redundant or ineffectual test data.

The system in step 470 may determine that a permutation is non-viable through any means known in the art, including as a function of expert knowledge of an implementer. For example, a person skilled in the art of database management would know that an rscan access method into a table in which every field is an index, is less efficient than an index scan into the same table when a relatively low number of rows qualify from that index. The system could then be programmed to delete, in step 470, any permutations that specify an rscan access of that table.

For example, if a table field contains a single-digit number that specifies a day of the week, that value may be limited to a set of values {0, 1, . . . 6} or to a set of values {1, 2, . . . 7}. If the system in step 440 had generated a set of representative single-digit numbers that consists of values {0, 1, . . . , 9}, three of these generated values (such as {7, 8, 9} or {0, 8, 9}) would be semantically meaningless. In this case, if the meaningless values had not been eliminated in step 440, the system would in step 470 filter out any permutations generated in step 450 that comprise the semantically meaningless values of this field.

In another example, if a query comprises a first variable that specifies a customer's Zip code and a second variable that specifies the customer's street address and state of residence, the system might deem to be non-viable any query that combines a Zip code value that could not be associated with the customer's state.

In step 480, the system forwards the resulting set of access requests to downstream components of the DBMS 2000, or other application, system, or platform served by embodiment of FIG. 4. These downstream components use the set of requests to perform operations that are an object of the embodiment. For example, the set could be used as a corpus to train a machine-learning query optimizer 210 of DBMS 2000, as a set of test data for a performance-evaluation module that determines the relative cost of each query plan specified in the set of requests, or as test data for verification components that evaluate the accuracy of output generated by the application, system, or platform when processing the test data.

In embodiments that comprise machine-training operations for an optimizer 210, the optimizer will analyze each access-request permutation in the revised set of requests in order to determine the relative cost of each query method. The optimizer 210 will make these determinations through means known in the art and described above in FIG. 2, either through direct measurement or by analyzing historical or logged data.

In step 490, the system may analyze the results of the operations performed in step 480 in order to update the rules by which the system generates permutations in step 450 and filters out permutations that are deemed to be non-viable in step 470. For example, if all permutations that specify one particular combination of access methods for four distinct tables all incur similar costs, the system might in step 490 modify its filtering rules to eliminate seemingly redundant permutations from this particular subset.

Although the set of requests analyzed in step 480 will have been generated by a novel procedure in accordance with embodiments of the present invention, the downstream operations performed in step 480 and 490 can generally be performed through techniques and technologies known in the art.

Examples and embodiments of the present invention described in this document have been presented for illustrative purposes. They should not be construed to be exhaustive nor limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A database-optimizer training system comprising a processor, a memory coupled to the processor, and a computer-readable hardware storage device coupled to the processor, the storage device containing program code configured to be run by the processor via the memory to implement a method for permutation-based machine learning for database query optimization, the method comprising:

the system receiving a data-access request that specifies a result to be retrieved from a database by a database-management system (DBMS), where the received request specifies a plurality of variables but does not specify a sequence of DBMS data-retrieval steps capable of generating the result;

the system enumerating a plurality of candidate query plans,
where each plan of the plurality of candidate query plans identifies a distinct set of data-retrieval steps that, when performed by the DBMS, are capable of generating the result,
where each plan of the plurality of candidate query plans specifies a distinct permutation of all possible values of each parameter of a plurality of data-access parameters,
and
where no two plans of the plurality of candidate query plans specify identical permutations;

the system generating a plurality of permuted data-access requests,
where each request of the plurality of permuted data-access requests is a rewritten version of the received data-access request that has been revised so as to direct the DBMS to use a corresponding plan of the plurality of candidate query plans,
where the enumerating further comprises the system choosing a set of representative values for each variable of the plurality of variables,
where each plan of the plurality of candidate query plans assigns a value to each variable of the plurality of variables,
where each assigned value of a first variable of the plurality of variables is selected from the set of representative values chosen for the first variable, and
where each distinct permutation of the all possible values identifies one possible value of each parameter of the plurality of data-access parameters and one chosen representative value of each variable of the plurality of variables,
where the plurality of candidate query plans in aggregate comprises all possible permutations of all possible values of each parameter of the plurality of data-access parameters and further comprises all possible permutations of the sets of representative values of all variables of the plurality of variables, and
where the plurality of permuted data-access requests in aggregate directs the DBMS to use all plans of the plurality of candidate query plans; and the system submitting the plurality of data-access requests, as a machine-learning corpus, to a training module that uses the corpus to improve automated training of a query-optimization component of the DBMS, such that the improved training teaches the query-optimization to provide improved query-optimization functionality to the DBMS.

2. The system of claim 1, further comprising:
the system, prior to the submitting, deleting from the plurality of permuted data-access requests any request that directs the DBMS to select a query plan that is not viable.

3. The system of claim 1,
where the received data-access request and each permuted data-access request is a Structured Query Language (SQL) query, and
where each permuted data-access request comprises SQL HINT statements that direct the DBMS to perform a distinct set of DBMS data-retrieval steps.

4. The system of claim 1, where each parameter of the set of data-access parameters is selected from the set consisting of:
a sequence in which database tables are accessed,
an access method used to access data stored in a database table,
a database table-traversal path, and
a join method by which data accessed from a database table is joined with data accessed from other database tables.

5. The system of claim 4, where a possible value of the access method is selected from the set consisting of:
an rscan (relational scan),
a tablespace scan,
a limited partition scan,
a partition-level rscan, and
an index scan that specifies a distinct index of a database table.

6. The system of claim 4, where a possible value of the join method is selected from the set consisting of:
a nested-loop join,
a sort merge join,
a hash join, and
a hybrid join.

7. A method for permutation-based machine learning for database query optimization, the method comprising:
receiving a data-access request that specifies a result to be retrieved from a database by a database-management system (DBMS), where the received request specifies a plurality of variables but does not specify a sequence of DBMS data-retrieval steps capable of generating the result;
enumerating a plurality of candidate query plans,
where each plan of the plurality of candidate query plans identifies a distinct set of data-retrieval steps that, when performed by the DBMS, are capable of generating the result,
where each plan of the plurality of candidate query plans specifies a distinct permutation of all possible values of each parameter of a plurality of data-access parameters,
and
where no two plans of the plurality of candidate query plans specify identical permutations;
generating a plurality of permuted data-access requests,
where each request of the plurality of permuted data-access requests is a rewritten version of the received data-access request that has been revised so as to direct the DBMS to use a corresponding plan of the plurality of candidate query plans,
where the enumerating further comprises choosing a set of representative values for each variable of the plurality of variables,
where each plan of the plurality of candidate query plans assigns a value to each variable of the plurality of variables,
where each assigned value of a first variable of the plurality of variables is selected from the set of representative values chosen for the first variable, and
where each distinct permutation of the all possible values identifies one possible value of each parameter of the plurality of data-access parameters and one chosen representative value of each variable of the plurality of variables,
where the plurality of candidate query plans in aggregate comprises all possible permutations of all possible values of each parameter of the plurality of data-access parameters and further comprises all possible permutations of the sets of representative values of all variables of the plurality of variables, and
where the plurality of permuted data-access requests in aggregate directs the DBMS to use all plans of the plurality of candidate query plans; and
submitting, by the database-optimizer training system, the plurality of data-access requests, as a machine-learning corpus, to a training module that uses the corpus to improve automated training of a query-optimization component of the DBMS, such that the improved training teaches the query-optimization to provide improved query-optimization functionality to the DBMS.

8. The method of claim 7, further comprising:
the system, prior to the submitting, deleting from the plurality of permuted data-access requests any request that directs the DBMS to select a query plan that is not viable.

9. The method of claim 7,
where the received data-access request and each permuted data-access request is a Structured Query Language (SQL) query, and
where each permuted data-access request comprises SQL HINT statements that direct the DBMS to perform a distinct set of DBMS data-retrieval steps.

10. The method of claim 7,
where each parameter of the set of data-access parameters is selected from the set consisting of:
a database table-traversal path,
a sequence in which database tables are accessed,
an access method used to access data stored in a database table, and
a join method by which data accessed from a database table is joined with data accessed from other database tables,
where a possible value of the access method is selected from the set consisting of:
an rscan (relational scan),
a tablespace scan,
a limited partition scan,
a partition-level rscan, and
an index scan that specifies a distinct index of a database table, and
where a possible value of the join method is selected from the set consisting of:
a nested-loop join,
a sort merge join,
a hash join, and
a hybrid join.

11. The method of claim 7, further comprising: providing, by the database-optimizer training system, at least one support service for at least one of creating, integrating, hosting, maintaining, and deploying computer-readable program code in the computer system, wherein the computer-readable program code in combination with the computer system is configured to implement the receiving, the enumerating, the generating, and the submitting.

12. A computer program product, comprising a computer-readable hardware storage device having a computer-readable program code stored therein, the program code configured to be executed by a database-optimizer training system comprising a processor, a memory coupled to the processor, and a computer-readable hardware storage device coupled to the processor, the storage device containing program code configured to be run by the processor via the memory to implement a method for permutation-based machine learning for database query optimization, the method comprising:
the system receiving a data-access request that specifies a result to be retrieved from a database by a database-management system (DBMS), where the received request specifies a plurality of variables but does not specify a sequence of DBMS data-retrieval steps capable of generating the result;
the system enumerating a plurality of candidate query plans,
where each plan of the plurality of candidate query plans identifies a distinct set of data-retrieval steps that, when performed by the DBMS, are capable of generating the result,
where each plan of the plurality of candidate query plans specifies a distinct permutation of all possible values of each parameter of a plurality of data-access parameters,
where each plan of the plurality of candidate query plans specifies a distinct permutation of all possible values of each parameter of a plurality of data-access parameters, and
where no two plans of the plurality of candidate query plans specify identical permutations;
the system generating a plurality of permuted data-access requests,
where each request of the plurality of permuted data-access requests is a rewritten version of the received data-access request that has been revised so as to direct the DBMS to use a corresponding plan of the plurality of candidate query plans,
where the enumerating further comprises the system choosing a set of representative values for each variable of the plurality of variables,
where each plan of the plurality of candidate query plans assigns a value to each variable of the plurality of variables,
where each assigned value of a first variable of the plurality of variables is selected from the set of representative values chosen for the first variable, and
where each distinct permutation of the all possible values identifies one possible value of each parameter of the plurality of data-access parameters and one chosen representative value of each variable of the plurality of variables,
where the plurality of candidate query plans in aggregate comprises all possible permutations of all possible values of each parameter of the plurality of data-access parameters and further comprises all possible permutations of the sets of representative values of all variables of the plurality of variables, and
where the plurality of permuted data-access requests in aggregate directs the DBMS to use all plans of the plurality of candidate query plans; and
the system submitting the plurality of data-access requests, as a machine-learning corpus, to a training module that uses the corpus to improve automated training of a query-optimization component of the DBMS, such that the improved training teaches the query-optimization to provide improved query-optimization functionality to the DBMS.

13. The computer program product of claim 12, further comprising:
the system, prior to the submitting, deleting from the plurality of permuted data-access requests any request that directs the DBMS to select a query plan that is not viable.

14. The computer program product of claim 12,
where the received data-access request and each permuted data-access request is a Structured Query Language (SQL) query, and
where each permuted data-access request comprises SQL HINT statements that direct the DBMS to perform a distinct set of DBMS data-retrieval steps.

15. The computer program product of claim 12,
where each parameter of the set of data-access parameters is selected from the set consisting of:
a database table-traversal path,
a sequence in which database tables are accessed,
an access method used to access data stored in a database table, and
a join method by which data accessed from a database table is joined with data accessed from other database tables,
where a possible value of the access method is selected from the set consisting of:
an rscan (relational scan),
a tablespace scan,
a limited partition scan,
a partition-level rscan, and
an index scan that specifies a distinct index of a database table, and
where a possible value of the join method is selected from the set consisting of:
a nested-loop join,
a sort merge join,
a hash join, and
a hybrid join.

* * * * *